United States Patent [19]
Saito et al.

[11] Patent Number: 4,752,784
[45] Date of Patent: Jun. 21, 1988

[54] THERMAL ELECTROSTATIC INK-JET RECORDING METHOD

[75] Inventors: Koichi Saito; Eiichi Akutsu; Yoshihiko Fujimura; Nanao Inoue, all of Kanagawa, Japan

[73] Assignee: Fuji Xerox Co., Ltd., Kanagawa, Japan

[21] Appl. No.: 60,087

[22] Filed: Jun. 9, 1987

[30] Foreign Application Priority Data

Jun. 10, 1986 [JP] Japan ............................... 61-134440

[51] Int. Cl.[4] ............................................... G01D 9/00
[52] U.S. Cl. ................................ 346/1.1; 346/140 R; 346/75; 400/126
[58] Field of Search ..................... 106/22, 23; 346/1.1, 346/140 PD, 75, 153.1, 155, 159; 400/126

[56] References Cited

FOREIGN PATENT DOCUMENTS 0174457 10/1983 Japan .................................... 106/22

*Primary Examiner*—E. A. Goldberg
*Assistant Examiner*—Huan H. Tran
*Attorney, Agent, or Firm*—Finnegan, Henderson, Farabow, Garrett & Dunner

[57] ABSTRACT

Thermal electrostatic ink-jet recording wherein improved stability and speed of operation are achieved by use of an ink having a viscosity ratio satisfying the relative $\mu R/\mu H > 10$, where $\mu R$ represents the viscosity of the ink at 20° C. and $\mu H$ represents the viscosity of the ink at a temperature between 70° C. and 200° C.

6 Claims, 2 Drawing Sheets

THERMAL ELECTROSTATIC INK-JET RECORDING METHOD

BACKGROUND OF THE INVENTION

The present invention relates to thermal electro-static ink-jet recording, and particularly to such recording method using an ink which has physical properties appropriate for stablizing the thermal electrostatic ink-jet recording operation to prevent erroneous jetting of the ink, while operating at high speed.

Examples of conventional non-impact ink-jet recording apparatus include an apparatus in which electrostriction elements, such as piezzo-electric elements or the like, are provided in an ink chamber, and the ink pressure within the ink chamber is raised by applying a voltage of a predetermined frequency to the elements so that a drop of ink can be jetted from an orifice of the ink chamber.

Such non-impact ink-jet recording methods have advantages compared to impact recording methods in that noise is reduced during operation and a special process, such as of photographic fixing, is not required, because the recording is accomplished by deposition of ink droplets on paper.

However, conventional ink-jet recording apparatus has structural limitations, e.g., in miniaturizing the ink-jet mechanism of the ink chamber provided with the electrostriction elements. Further, it is difficult to obtain a predetermined pel density, and mechanical scanning is required. Accordingly, there are limitations on improving the printing speed. Furthermore, problems such as an ink-clogging of the orifice can occur.

To overcome such disadvantages, several kinds of ink-jet recording apparatuses, for example, (1) the magnetic ink-jet system, (2) the plane scanning ink-jet system, (3) the thermal bubble ink-jet system, (4) the electrostatic attraction ink-jet system, and others, have been proposed. The first, the magnetic ink-jet system, employs an array of magnetic electrodes disposed at intervals corresponding to pel density. The array is driven in response to a pel signal to generate a magnetic field so as to thereby form a meniscus structure of ink, and an electrostatic field is applied to the meniscus to jet ink. In the second, the plane scanning ink-jet system, a slit-like ink reservoir is provided in parallel to an array of electrodes disposed at intervals corresponding to pel density. An electric, field pattern corresponding to a pel signal is formed between the electrode array and an electrode disposed opposite the electrode array behind a recording paper. On the basis of the electric field pattern, ink is jetted from the ink reservoir. In the third, the thermal bubble ink-jet system, an array of heating elements is disposed at intervals corresponding to pel density so that ink is heated in response to an image signal to produce surface boiling (500° to 600° C.) to raise the pressure within an orifice so as to jet a drop of ink. In the fourth, the electrostatic attraction ink-jet system, ink is electrically attracted by an electric field created in response to an image signal. At the same time, a stream of air is applied to the ink to jet the ink.

The ink-jet recording apparatuses of the systems of the above first, third and fourth types have an advantage in that high-speed recording can be accomplished because the ink is jetted by the cooperative action of a magnetic field pattern (or electric field pattern) formed in response to an image signal and an electric field (or airflow). The ink-jet recording apparatus of the second of the above systems has the advantage of avoiding ink-clogging because an orifice for jetting the ink is not required.

However, these ink-jet recording apparatuses have disadvantages as follows. With the magnetic ink-jet system color imaging is difficult because magnetic material for magnetizing ink is contained in the ink. Because the signal voltage level should be high in the plane scanning ink-jet system, an electric field is often formed at a non-selected part of the array. Accordingly, there is a possibility of erroneous ink jetting. Furthermore, because resting time is long, the recording speed cannot be made sufficiently high. In the thermal bubble ink-jet system there is a possibility of shortening the lifetime of the heating elements because of cavitation caused by appearance and disappearance of air bubbles. In the electrostatic attraction ink-jet system, because the ink attraction voltage level should be high, it is difficult to integrate driving elements at intervals corresponding to pel density. Accordingly, when a matrix driving method is employed, the recording speed cannot be made sufficiently high.

In view of the aforementioned disadvantages of the above-mentioned ink-jet recorders, there has also been proposed a thermal electrostatic ink-jet recording apparatus superior in durability, in jetting accuracy, in color imaging, and in recording speed.

The latter thermal electrostatic ink-jet recording apparatus is effectuated through a process in which the surface tension, interfacial tension, viscosity, and electric resistance of electrically resistive or conductive ink are lowered to form a meniscus of ink, and an electric field is concentrated on the meniscus to thereby jet the ink from the orifice.

In this thermal electrostatic ink-jet recording apparatus, however, there is a possibility of erroneous jetting of ink from a non-heated part of the recording head, not in response to an image signal, when conditions inappropriate for jetting ink are set. Accordingly, a disadvantage is such that printing quality may deteriorate due to the erroneous ink jetting.

SUMMARY OF THE INVENTION

It is therefore an object of the present invention to overcome the above-mentioned disadvantage of thermal electrostatic ink jet recording.

It is another object of the present invention to achieve an improved thermal electrostatic ink-jet recording method using an ink, which has appropriate physical properties to make it possible to easily set conditions appropriate for jetting ink.

The inventors have found that the viscosity characteristics of the ink strongly influence the aforementioned physical properties, and, consequently, affect the stability and speed of thermal electrostatic ink-jet recording. More specifically, the use of an ink having a viscosity ratio satisfying the relation, $\mu_R/\mu_H > 10$, wherein $\mu_R$ represents the viscosity of the ink at 20° C. and $\mu_H$ represents the viscosity of the ink at the temperature in the range of 70° C. to 200° C., in thermal electrostatic ink-jet recording results in improved stability and higher speed operation of the recorder.

BRIEF DESCRIPTION OF THE DRAWINGS

The manner in which the above and other objects, features, and advantages of the present invention are achieved and the construction and operation of the invention itself will be more apparent upon reading the following detailed description in view of the drawings, in which.

DETAILED DESCRIPTION OF THE INVENTION

Figure 1:
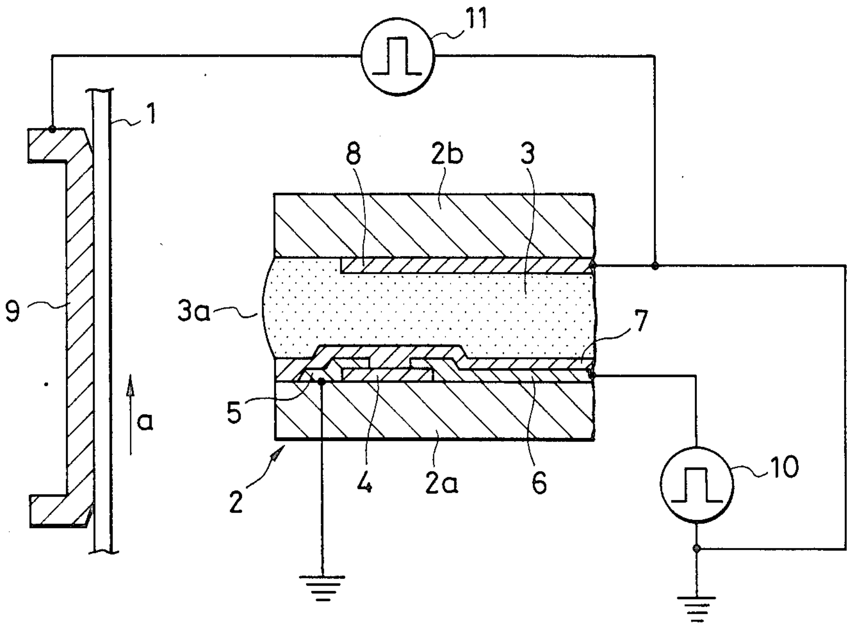
FIG. 1 is a schematic diagram showing the construction of a recording apparatus for use with the ink and method of the present invention.

Referring to FIG. 1, there is shown a thermal electrostatic ink-jet recording apparatus for use with the method and ink of the present invention. The apparatus comprises a recording head 2, power sources 10 and 11, electrodes 5, 6, 8 and 9 and associated circuitry as hereinafter described. Recording paper 1 is arranged so as to be movable in the direction of the arrow (that is, in the subscanning direction) step by step. An ink chamber 3 is formed in recording head 2 by a pair of wall members 2*a* and 2*b* extending in the main-scanning direction. On the inner surface of one wall member 2*a*, there are provided a plurality of spaced apart driving electrodes 6 which are electrically connected to a common electrode 5 in the main-scanning direction to form an array. A protecting layer 7 is disposed over the surfaces of the electrodes 5 and 6. An induction electrode 8, having its front end, i.e., the end toward the orifice 3*a*, disposed at a predetermined distance away from the liquid surface of the ink held in the orifice, is provided on the inner surface of the other wall member 2*b*. A counter electrode 9 is provided behind the recording paper 1. A driving circuit 10 is provided between the common electrode 5 and the respective driving electrode 6, for supplying electric current to at least one selected electric resistance heating element 4 at a predetermined level when the image signal is "1". Thus, thermal energy is applied to a portion of the ink in chamber 3. An electric source 11 for forming an electric field for jetting ink is provided between the induction electrode 8 and the counter electrode 9. Thus, electric energy is applied to the ink in chamber 3 within the electric field so formed.

Figure 2:
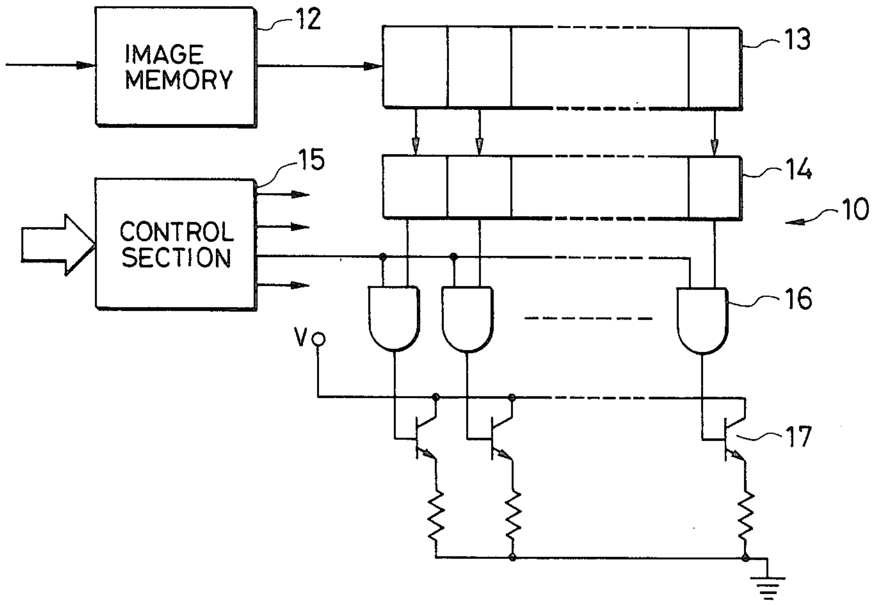
FIG. 2 is a block diagram of the driving circuit depicted in FIG. 1.

Referring to FIG. 2, there is shown a driving circuit 10 constituted by a shift register 13 arranged to receive an image signal serially from an image memory 12. A latch circuit 14 is provided for latching the signal condition of the shift register 13, AND circuits 16 are arranged to receive an enabling image signal from a control section 15 so as to output "1" or "0" in response to the bit condition ("1" or "0") of the respective bits of the latch circuit 14. Transistors 17 are switched on by "1" of the corresponding AND circuits 16 to thereby apply a voltage V to the corresponding heating element(s) 4 to cause them to generate heat which is applied to that portion of the ink surrounding the corresponding heating elements.

The operation of the circuit of FIG. 2 is as follows:

When the serial image signals are fed to the shift resistor 13 from the image memory 12, the latch circuit 14 latches the signals. Upon reception of an enabling signal from the control section 15, the respective AND circuit 16 generates a driving signal corresponding to the image signal in the associated bit of the shift register 13 in synchronism with the enabling signal. In response to the driving signal, the corresponding transistor 17 is turned on so that the voltage V is applied to the corresponding heating element(s) 4. In the image section, ink at the orifice 3*a* is heated to form a meniscus. At the same time, the ink is drawn toward electrode 9 due to electrostatic attraction resulting from the applied electric field (that is, by application of a pulse by means of the electric source 11). Thus, ink is jetted from the orifice and deposited on the recording paper 1.

In such a recording operation, printing conditions were tested using various types of ink having different physical properties. The following table shows, for each test, the type of ink used, its properties, test conditions and results. In the table "Back part" refers to the unheated portion of the recording head, back from the ink jet orifice and "Heated part" refers to the heated portion near the orifice.

| Ink | Temp. (°C.) Back part | Temp. (°C.) Heated part | Visc. (cps) Back part | Visc. (cps) Heated part | Viscosity ratio $\mu_R/\mu_H$ | Voltage impression time for starting attraction at heated parts ($t_H$) | Voltage impression time for starting attraction at back part ($t_L$) | $t_L/t_H$ | Stability | S |
|---|---|---|---|---|---|---|---|---|---|---|
| 1 | 20 | 160 | 700 | 2.5 | 280 | 250 μsec | 60 msec | 240 | ◎ | ◎ |
| | 20 | 80 | 700 | 17 | 41.2 | 1.5 msec | 60 msec | 40 | ◎ | Δ |
| 2 | 20 | 160 | 200 | 2.2 | 91 | 270 μsec | 23 msec | 85 | ◎ | ◎ |
| | 20 | 80 | 200 | 12 | 16.7 | 1.7 msec | 23 msec | 13.5 | ○ | Δ |
| 3 | 20 | 160 | 100 | 2 | 50 | 250 μsec | 6 msec | 24 | ○ | ◎ |
| | 20 | 80 | 100 | 8 | 12.5 | 900 μsec | 6 msec | 6.7 | ○ | ○ |
| | 60 | 160 | 20 | 2 | 10 | 250 μsec | 1.6 msec | 6.4 | ○ | ◎ |
| | 60 | 120 | 20 | 3.5 | 5.7 | 670 μsec | 1.6 msec | 2.4 | X | ○ |
| 4 | 20 | 160 | 30 | 2 | 15 | 300 μsec | 2 msec | 6.7 | ○ | ◎ |
| | 20 | 80 | 30 | 5 | 6 | 800 μsec | 2 msec | 2.5 | X | Δ |
| | 60 | 160 | 8 | 2 | 4 | 300 μsec | 730 μsec | 2.4 | X | ◎ |
| | 60 | 120 | 8 | 3 | 2.7 | 600 μsec | 730 μsec | 1.2 | X | Δ |
| 5 | 20 | 160 | 20 | 1.5 | 13.3 | 200 μsec | 2 msec | 10 | ○ | ◎ |
| | 20 | 80 | 20 | 4 | 5.0 | 600 μsec | 2 msec | 3.3 | Δ | Δ |
| | 60 | 160 | 5.5 | 1.5 | 3.7 | 150 μsec | 650 μsec | 4.3 | Δ | ◎ |
| | 60 | 120 | 5.5 | 2.5 | 2.2 | 250 μsec | 650 μsec | 2.6 | X | ◎ |
| 6 | 20 | 80 | 10 | 3.5 | 2.9 | 450 μsec | 1 msec | 2.2 | X | ○ |
| 7 | 20 | 160 | 5 | 1.5 | 3.3 | 180 μsec | 550 μsec | 3.1 | X | ◎ |
| | 20 | 80 | 2 | 1.5 | 1.3 | 180 μsec | 200 μsec | 1.1 | X | ◎ |

In the table, inks 1, 2, 3, 5 and 7 used a liquid paraffin as a base, and inks 4 and 6 used a polyhydric alcohol as a base. In the table, ◎ represents "Excellent," ○ represents "Good", Δ represents "Fair", and X represents "Failure".

Figure 3:
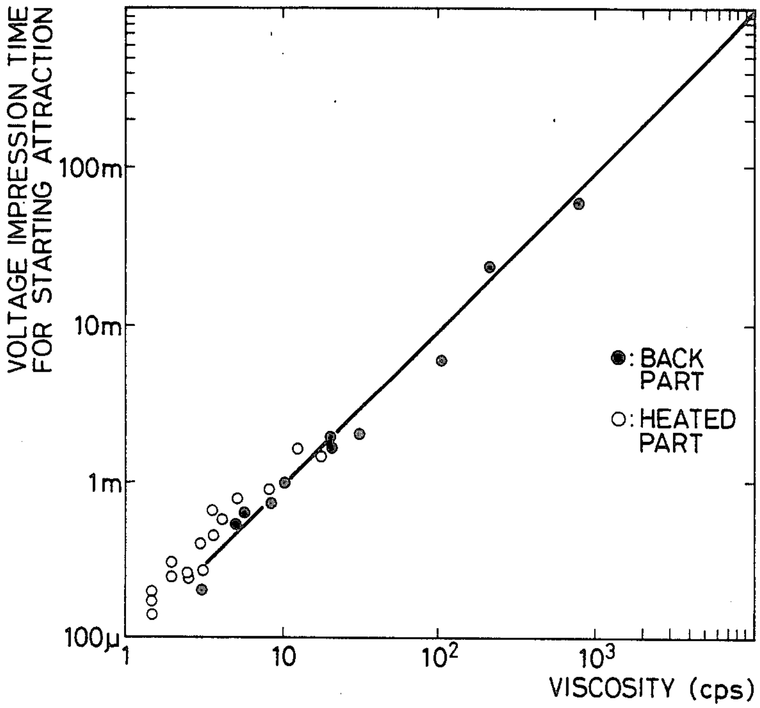
FIG. 3 is an explanatory drawing showing the relation of the ink viscosity and the voltage impression time for electrostatic attraction.

FIG. 3 is a plot of data from the table showing the effect of viscosity on the voltage impression time for starting attractive of the ink toward the counter electrode 9. This is directly related to the stability and speed of the recording operation, as indicated by the right two columns in the table. The results of the test indicate the following:

(1) It is preferable that the ratio $t_L/t_H$, of the voltage impression time $t_L$ for starting attraction at the back part (non-heated part) to the voltage impression time $t_H$ for starting attraction at the heated part is as large as possible.

(2) Although stability and high speed can be expected to a certain degree even when the above ratio $t_L/t_H$ is 3.3 or 6.7, it is preferable that the ratio be not less than 10 so as to be assured of operating with an ink having satisfactory properties range.

The above conclusion was arrived at the basis of the following experiments carried out by the inventors.

Heat conditions were determined by measuring the peak temperature of ink at the head end portion. The measurement was carried out with the use of an infrared microscope, RM-2A, made by Nihon Barnes Co. Two types of ink, that is, the liquid paraffin base pigment dispersion type ink and the polyhydric alcohol base dye dissolution type ink, were diluted with respective solvents, followed by adjusting viscosity and volume resistivity. When diluted, the conductivity was adjusted so that the volume resistivity was within a range of from $10^6$ Ωcm to $10^{10}$ Ωcm (20° C.). In the case of the pigment dispersion type ink, the adjustment of the volume resistivity was carried out by adjusting the volume of the conductive carbon black. In the case of the dye dissolution type ink, the adjustment of the volume resistivity was carried out by adjusting the additional volume of potassium sulfate. The viscosity was measured by combination of rotary Vismetron viscometer (made by Tokyo Keiki Co., Ltd.) and oil bath.

Figure 4:
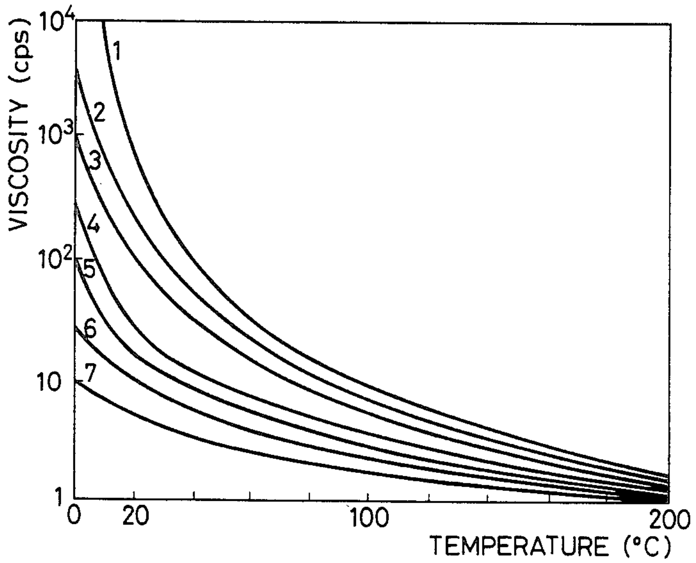
FIG. 4 is an explanatory drawing showing the relation of the temperature and the ink viscosity.

FIG. 4 shows the effect of temperature on the viscosity of the inks used. In the drawing the curves 1 to 7 refer the aforementioned inks 1 to 7, respectively.

Although it has been mentioned that the stability and speed of operation are important, the necessity of high-speed operation is secondary compared with the necessity of stable operation.

In practice, the temperature increase in the ink varies within a range of from about 0° C. to about 50° C. depending upon the environmental temperature and the inside temperature of the thermal electrostatic ink-jet recording apparatus. Accordingly, considering that the stability is the most important, it is desired that the temperature increase in the ink due to heating by the heating elements is not smaller than 50° C. It is apparent from the results of the table that the upper limit of the temperature is determined by the need of preventing destruction of the heating elements, saving the consumption of electric power, and of preventing boiling and vaporizing of ink, though the stability increases as the temperature difference increases. Generally, the maximum ink temperature is about 200° C. Accordingly, on the assumption that the room temperature is 20° C., ink in which the viscosity decreases to 1/10 at a temperature in the range of 70° C. to 200° C. should be used for thermal electrostatic ink-jet recording.

The ink solvent used in the practice of the present invention is not limited by the specific embodiments described above, but other solvents such as paraffin-group hydrocarbons, olefin group hydrocarbons, mineral oil-group solvents, polyhydric alcohols, and the like may be used.

In the system of the thermal electrostatic ink-jet recording, the ink in chamber is partially heated at a temperature of 200° C.-250° C. to thereby lower the viscosity of the ink for jetting. Therefore, this system requires an ink having good stability in heat-resistance. However, the conventional ink-jet recording system uses water ink or oil ink which has less efficiency of heat-resistance. Further, an ink used in the bubble ink-jet system has also less efficiency of heat-resistance. Therefore, the thermal electrostatic ink-jet recording system cannot use such an ink employed in the conventional system, since solvent contained in the ink may be vaporized by the heat or, in an extreme case, the solvent may be ignited to cause a fire.

Accordingly, the system of the invention requires an ink having a good efficiency of heat-resistance at a temperature higher than at least 250° C. in order to prevent the ink from vaporizing due to the heat. The system of the invention may use any ink having the above-described efficiency of the heat-resistance. Such an ink may preferably be an oil ink mainly containing high boil organic solvent, the content thereof being 20 to 90 parts by weight. In such an organic solvent, particularly, naphthalene, tetralin and derivatives thereof are preferable in view of solubility and dispersion ability of dye and pigment used as colorant.

Specific examples of naphthalene and the deviatives thereof include naphthalene, isopropyl-substituted naphthalene, mono-substituted naphthalene, di-substituted naphthalene, tri-substituted naphthalene, and tetra-substituted naphthalene. More specifically, in the mono-substituted naphthalene, there are 1-isopropyl naphthalene, 2-isopropyl naphthalene and 3-isopropyl naphthalene. In the di-substituted naphthalene, there are 2,5-diisopropyl naphthalene, 2,6-diisopropyl naphthalene, 1,3-diisopropyl naphthalene, 1,4-diisopropyl naphthalene, 1,5-diisopropyl naphthalene and the like. In these isopropyl-substituted naphthalene, for example, 2,7-diisopropyl naphthalene has a good heat-resistance at a temperature higher than 280° C., a surface tension of which is at 38 dyne/cm at 25° C., and vapor pressure of which is at 1 mmHg at ordinary temperatures and that at 10 mmHg at 150° C.

Further, specific example of tetralin and the deviatives thereof include tetralin, mono-substituted tetralin, di-substituted tetralin, tri-substituted tetralin and tetra-substituted tetralin. More specifically, in the mono-substituted tetralin, there are 1-isopropyl tetralin, 2-isopropyl tetralin and 3-isopropyl tetralin. In the di-substituted tetralin, there are 2,5-diisopropyl tetralin, 2,6-diisopropyl tetralin, 2,7-diisopropyl tetralin, 1,3-diisopropyl tetralin, 1,4-diisopropyl tetralin, 1,5-diisopropyl tetralin and the like. These isopropyl-substituted tetralin have physical properties which is approximate to that of the above-described isopropyl-substituted naphthalene with respect to heat resistance, viscosity characteristics, surface tension, vapor pressure and nonpoison. 2,6-diisopropyl tetralin, for example, is less than 1 mmHg in vapor pressure at ordinary temperatures.

The ink may preferably contain, as a viscosity control agent, a higher fatty acid such as linoleic acid, oleic acid and the like, the content thereof being 5–40 parts by weight. The oleic acid has a good heat-resistance at a temperature higher than 300° C. and a surface tension of which is 33 dyne/cm at 20° C. The linoleic acid also has a good heat-resistance at a boiling point of 229°-230° C.

Further, another organic solvent such as xylene, toluene, decane or dodecane, or higher alchol such as cetyl alcohol and the like may be included into the ink in order to control the viscosity of the ink composition. Thus, a predetermined viscosity characteristics can be obtained by suitably combining the above solvents.

Another component may be included into the ink, such as dye or pigment. Specifically, for example, phthalocyanine series dye, carbon black, anthraquinone series dye and the like may be applicable for a component of the ink.

Furthermore, the ink may contain a conductive material such as a carbon, an iron chloride, and the like for obtaining conductivity, a dispersion stabilizer for stabilizing the dispersion of the dye or pigment, a surface active agent for controling the surface tension of the composition, a mold inhibitor, an insecticide, and the like.

Thus, in accordance with the above findings, the inventors have surprisingly found that in thermal electrostatic ink-jet recording the stability and high speed of the recording operation can be improved, if the ink has a viscosity ratio satisfying the relation $\mu_R/\mu_H$ 10 where $\mu_R$ represents the viscosity of the ink material at 20° C. and $\mu_H$ represents the viscosity of the ink material at the temperature of 70° C. to 200° C.

Having described a preferred embodiment of the present invention, variations and modification thereof, falling within the scope of the appended claims, will become apparent to one skilled in the art.

What is claimed is:

1. A method for recording images on a recording medium by jetting an ink at the recording medium comprising steps of:

providing a plurality of spaced-apart electric resistance heating elements;

providing said ink adjacent to said electric resistance heating elements, said ink having a viscosity ratio which satisfies a relation $\mu_R/\mu_H > 10$ where $\mu_R$ represents the viscosity of said liquid coloring agent at 20° C. and $\mu_H$ represents the viscosity of said ink at a temperature in the range of 70° C. to 200° C.;

providing an induction electrode a predetermined distance from the surface of said ink adjacent said heating elements and providing a counter electrode behind said recording medium;

forming an electric field between said electrodes and applying the electric field to said ink; and applying electric current to selected electric resistance heating elements in response to image signals to heat portions of said ink adjacent the selected electric resistance heaters to a temperature such that ink in the heated portions is jetted toward said counter electrode.

2. The method of claim 1, wherein said viscosity ratio satisfies the relation $\mu_R/\mu_H > 50$.

3. The method of claim 1, wherein said viscosity ratio satisfies the relation $\mu R/\mu H > 90$.

4. The method of claim 1, wherein said ink is a paraffin-base ink.

5. The method of claim 1, wherein said ink is a polyhydric alcohol-base ink.

6. The method of claim 4 wherein said viscosity ratio satisfies the relation $\mu_R/\mu_H > 90$.

* * * * *